May 12, 1942.  C. E. PETERSON  2,282,767
FILTER HOLDER
Filed June 29, 1940
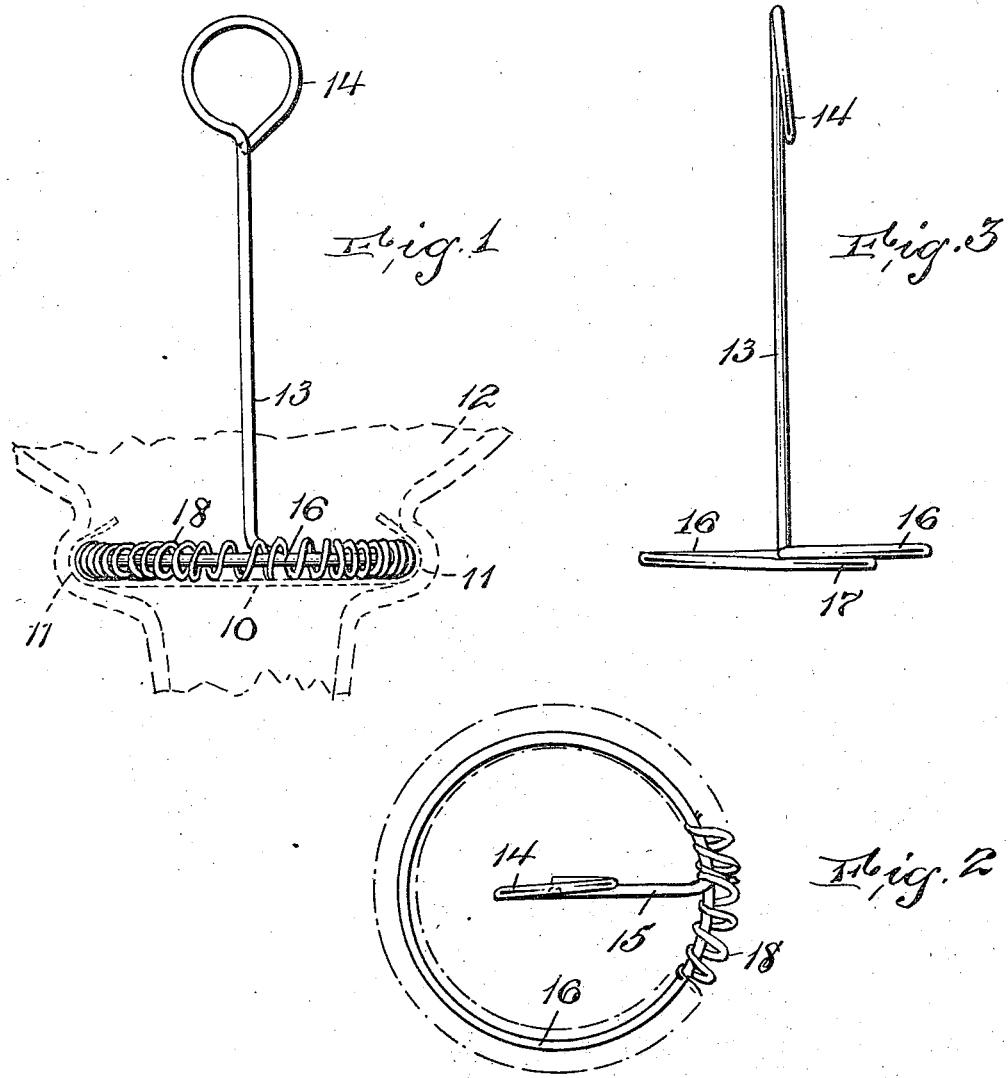
INVENTOR
Carl E. Peterson,
BY
Wm. H. Caufield,
ATTORNEYS Patented May 12, 1942

2,282,767

UNITED STATES PATENT OFFICE 2,282,767

FILTER HOLDER

Carl E. Peterson, Montclair, N. J., assignor to Eastern Tool & Mfg. Co., Bloomfield, N. J.

Application June 29, 1940, Serial No. 343,075

2 Claims. (Cl. 210—162)

This invention relates to an improved filter holder for use in holding cloth filters in the body of coffee-makers and similar utensils. The coffee-makers or coffee urns are familiar articles of merchandise and include a top globe or bowl having an annular recess on the inside at the bottom. The bowl receives the coffee and has a readily insertible bottom which serves as a filter. The filter is held by a holder and the improved holder presented here is the invention. The invention is designed to provide a stable and economical form of article, easily manufactured and readily used and comprising two wire members easily assembled to provide the complete article.

The invention is illustrated in the accompanying drawing in which Figure 1 is a side view of the improved holder showing the filter and part of the bowl in dotted outline. Figure 2 is a top view of the article shown in Figure 1. Figure 3 is a side view of the main supporting member of the article, with the more resilient member omitted.

The holder is adapted for use by reason of its being placed inside the edges of a filter 10, usually of cloth, the cloth and part of the device being insertible in an annular recessed part 11 of the inside of the bottom part of the bowl 12.

The holder comprises two members, one member being relatively stiff and comprising a stem 13 arranged vertically and usually having the curled end 14 for easily inserting the fingers when the device is to be removed from the bowl. The stem is bent at the bottom to extend laterally as an arm 15 and the wire is bent at the end of the arm to form a ring 16 which extends more than a complete circle with its free end 17 overlapping the juncture of the ring 16 and the arm 15.

The second member is a relatively flexible wire helical spring 18 which surrounds the ring 16 and is compressible to the extent of allowing it to be pressed down beyond the upper edge of recess 11 and thus fit into the recess to hold the filter 10 in place while exposing practically the entire area of the filter to the passage of liquid coffee from the ground coffee resting on the filter.

The spring 18 is readily put in place in manufacture by spreading the free end 17 from the ring 16 far enough to allow the spring 18 to be slid along the ring. Then the end 17 is allowed to spring back and the spring 18 is passed over the ring 16 and the end 17. The spring thus has its ends interlocked at the juncture of the arm 15 and the ring 16. The spring 18 is longer than the circumference of the ring 16 and with its ends at the arm 15 it is under a compression strain that forces it outward and the inner parts of the loops of the spring 18 rest against the inner edges of the ring 16 and thus allows ready yielding of spring 18 in order to reduce the diameter of the holder on insertion into the recess of the bowl.

In use the filter, usually cloth, is placed under the spring 18 and around the edges of the spring and the article passed down flatwise into the bowl and then snapped into the recess 11. The device is thus held firmly in place and the filter 10 is held taut and forms the temporary bottom of the bowl.

To remove the article the stem 13 is pulled up sharply and the filter is pulled up from the recess 11 for washing or for substitution of another filter.

I claim:

1. A filter holder comprising a stiff wire member having a vertical stem forming a handle and bent at the bottom into a radial arm and an annular ring with an overlapping end, and a resilient wire helical spring arranged around the ring and enclosing the overlapping part aforesaid, the inner side of the spring engaging the inner side of the ring when not in use to allow the spring to be compressed on insertion into a utensil.

2. A filter holder comprising two wire members, one member being of relatively stiff wire forming a vertical stem and bent at the bottom of the stem to form a horizontally extending arm and then formed into a ring with the end of the wire overlapping the ring at its juncture with the arm, the second member comprising a resilient helical spring greater in length than the circumference of the ring whereby the spring when placed on the ring with its ends at the arm will be yieldingly held to project radially from the ring for its entire circumference.

CARL E. PETERSON.